US006611482B2

(12) United States Patent
Ma et al.

(10) Patent No.: US 6,611,482 B2
(45) Date of Patent: Aug. 26, 2003

(54) ERROR SIGNAL DETECTING APPARATUS FOR OPTICAL RECORDING/REPRODUCING APPARATUS

(75) Inventors: Byung-in Ma, Suwon (KR); Chong-sam Chung, Suwon (KR); In-sik Park, Suwon (KR); Byoung-ho Choi, Suwon (KR); Tae-yong Doh, Suwon (KR)

(73) Assignee: Samsung Electronics Co., Ltd., Suwon (KR)

( * ) Notice: Subject to any disclaimer, the term of this patent is extended or adjusted under 35 U.S.C. 154(b) by 44 days.

(21) Appl. No.: 09/812,714

(22) Filed: Mar. 22, 2001

(65) Prior Publication Data

US 2001/0055255 A1 Dec. 27, 2001

(30) Foreign Application Priority Data

Mar. 22, 2000 (KR) ........................................ 2000-14550

(51) Int. Cl.$^7$ ................................................. G11B 7/00
(52) U.S. Cl. ............................... 369/53.19; 369/44.32; 369/44.41
(58) Field of Search .......................... 369/44.28, 44.29, 369/44.32, 44.41, 53.1, 53.11, 53.12, 53.14, 53.19

(56) References Cited

U.S. PATENT DOCUMENTS

| | | | | | |
|---|---|---|---|---|---|
| 5,523,989 | A | * | 6/1996 | Ishibashi | 369/109.01 |
| 5,703,855 | A | * | 12/1997 | Kirino et al. | 369/124.14 |
| 6,242,648 | B1 | * | 6/2001 | Yamasaki et al. | 564/405 |

* cited by examiner

Primary Examiner—Muhammad Edun
(74) Attorney, Agent, or Firm—Staas & Halsey LLP

(57) ABSTRACT

An error signal detecting apparatus for an optical recording/reproducing apparatus, the error signal detecting apparatus including a photodetector to receive light reflected and diffracted by a recording medium, and a signal processor to detect an error signal by calculating a detection signal of the photodetector. The photodetector includes a plurality of light receiving areas to independently receive light of a light area in which the profile of the light changes to the opposite profile according to the tangential tilt of the recording medium. The signal processor detects a tangential tilt error signal from detection signals of the light receiving areas. Thus, a signal output from the error signal detecting apparatus does not change when a shift is generated in the objective lens or the distance between the objective lens and the disc is deviated from the on-focus position. Also, a change in the profile of the light beam according to a relative tangential tilt with respect to the objective lens of a recording medium in land/groove format can be properly detected so that an accurate tangential tilt error signal can be detected.

33 Claims, 10 Drawing Sheets

ERROR SIGNAL DETECTING APPARATUS FOR OPTICAL RECORDING/REPRODUCING APPARATUS

CROSS-REFERENCE TO RELATED APPLICATIONS

This application claims the benefit of Korean Application No. 00-14550, filed Mar. 22, 2000, in the Korean Patent Office, the disclosure of which is incorporated herein by reference.

BACKGROUND OF THE INVENTION

1. Field of the Invention

The present invention relates to an error signal detecting apparatus for an optical recording/reproducing apparatus, and more particularly, to an error signal detecting apparatus for an optical recording/reproducing apparatus which can detect a relative tangential tilt error signal between an objective lens and a recording medium by using a main beam to record/reproduce information signals on/from a recording medium.

2. Description of the Related Art

In general, an optical pickup records and reproduces information signals while moving across a recording medium such as a disc rotating on a turntable. When the rotating disc is tilted due to a warp in the disc or an error in installation of the disc, the recording and reproducing signals deteriorate.

In particular, in the case of an optical pickup adopting a light source for emitting light having a short wavelength and an objective lens having a large numerical aperture (N.A.) to increase the density of recording, since an optical aberration is proportional to $\lambda/(NA)^3$, a large coma due to the tilt of a disc is generated so that recording and reproducing signals are further deteriorated.

Thus, to prevent the deterioration of the recoding/reproducing signals by detecting the amount of the tilt of the disc to compensate for the tilt, a conventional apparatus 100 for detecting a relative tilt between a disc 10 and an objective lens 7 by using a detection signal of a photodetector 9 for reproducing is known, as shown in FIG. 1.

Referring to FIG. 1, laser light emitted from a light source 1 for recording and reproducing information signals passes through a beam splitter 5 and is then input to the objective lens 7. The objective lens 7 focuses incident light emitted from the light source 1 to form an optical spot on a recording surface of the disc 10. Light reflected by the recording surface of the disc 10 passes through the objective lens 7 and is reflected by the beam splitter 5 to proceed toward the photodetector 9. Here, reference numeral 8 denotes a photosensing lens for focusing the incident light reflected by the beam splitter 5 and detected by the photodetector 9.

The photodetector 9 is formed of four separate plates A, B, C and D, as shown in FIG. 2, each independently performing a photoelectric conversion with respect to the incident light thereof. Thus, information and error signals are detected by appropriately adding and/or differentiating detection signals generated by the respective separate plates A, B, C and D.

Referring to FIG. 2, the conventional tilt error signal detecting apparatus 100 includes the photodetector 9 for reproducing information signals. The photodetector 9 is formed of four separate plates A, B, C and D, first and second adders 11 and 13 for respectively adding the detection signals of the separate plates A and B and the separate plates C and D, and a differentiator 15 for subtracting the signals input from the first and second adders 11 and 13 to output a tangential push-pull signal as a tilt error signal.

The tilt error signal output from the conventional tilt error signal detecting apparatus 100 having the above structure is input to an apparatus for adjusting the relative tilt between the objective lens 7 and the disc 10, to thereby correct the tangential tilt error.

Since the conventional tilt error signal detecting apparatus 100, although it has the advantage of a simple structure, detects the tangential tilt error signal by subtracting the detection signals of the separate plates at either side with respect to a center axis of the photodetector 9 which is parallel to the radial direction of the disc 10, when the objective lens 7 is shifted or the distance between the objective lens 7 and the disc 10 is deviated from an on-focus position, the signal output therefrom changes, and thus the tangential tilt error cannot be accurately detected.

Also, the profile of a light beam, which is focused on the disc 10 as an optical spot and is reflected/diffracted, as shown in FIG. 3, and is detected by the photodetector 9 according to the tangential tilt between the objective lens 7 and the disc 10, changes. This is shown in FIGS. 4A though 4C. Thus, the conventional tilt error signal detecting apparatus 100 as described with reference to FIGS. 1 and 2 cannot accurately detect the tangential tilt error signal.

FIG. 3 shows the light reflected by the disc 10 in a land/groove format and diffracted to the $0^{th}$ order and the $\pm 1^{st}$ order. As shown in FIG. 3, the $0^{th}$ order and the $\pm 1^{st}$ order diffraction light overlap one another in a radial direction of the disc 10. Also, some areas of the $+1^{st}$ order diffraction light and the $-1^{st}$ order diffraction light may overlap one another.

FIGS. 4A through 4C show the profiles of a light beam reflected by the disc 10 in land/groove format such as next generation DVDs, and so-called HD-DVD RAM discs, in which a track pitch is, for example, 0.37 μm and is detected by the photodetector 9. FIG. 4A shows the case in which a negative tangential tilt error of about −0.5 degrees occurs. FIG. 4B shows the case in which the tangential tilt error does not occur. FIG. 4C shows the case in which a positive tangential tilt error of about +0.5 degrees occurs.

As can be seen from FIGS. 4A and 4C, when the tangential tilts are generated in opposite directions, light beams landing on the separate plates A and D and the separate plates B and C show patterns of the profiles of the light beams opposing each other with respect to a center axis in the tangential direction. Also, the beam profile mainly lands on the inner portion of the separate plate with respect to the tangential tilt in one direction, and on the outer portion of the separate plate with respect to the tangential tilt in the opposite direction.

As described above, in the conventional tilt error detecting apparatus using the photodetector 9 having four separate plates, a tangential tilt error signal is detected by subtracting a sum signal of the detection signals of the separate plates C and D from a sum signal of the detection signals of the separate plates A and B. Therefore, the conventional tilt error detecting apparatus is not able to accurately detect a change in the beam profile according to the tangential tilt and thus an accurate tangential tilt error signal cannot be detected.

SUMMARY OF THE INVENTION

Accordingly, it is an object of the present invention to provide an error signal detecting apparatus for an optical recording/reproducing apparatus which can detect a change in the profile of a light beam according to the tangential tilt by adopting a photodetector so that a highly accurate tangential tilt error signal can be detected.

Additional objects and advantages of the invention will be set forth in part in the description which follows, and, in part, will be obvious from the description, or may learned by practice of the invention.

The foregoing and other objects of the present invention are achieved by providing an error signal detecting apparatus for an optical recording/reproducing apparatus comprising a photodetector to receive [for receiving] light reflected and diffracted by a recording medium, and a signal processor to detect an error signal by calculating a detection signal of the photodetector, in which the photodetector includes a plurality of light receiving areas, each independently receiving light where the profile of a beam changes to the opposite profile according to the tangential tilt of the recording medium, and the signal processor detects a tangential tilt error signal from detection signals of the light receiving areas.

It is preferred in the present invention that the photodetector has at least six separate structures and comprises first and second inner light receiving areas arranged in a tangential direction of a track of the recording medium, first and second outer light receiving areas arranged at both sides of the first inner light receiving area in a radial direction of the recording medium, and third and fourth outer light receiving areas arranged at one side of the second and first outer light receiving areas, and at both sides of the second inner light receiving area, in the radial direction of the recording medium. The signal processor comprises a first adder to add a detection signal of the first inner light receiving area and detection signals of the third and fourth outer light receiving areas, a second adder to add a detection signal of the second inner light receiving area and detection signals of the first and second outer light receiving areas, and a differentiator to subtract the detection signals received from the first and second adders and to output a tangential tilt error signal.

In another embodiment of the present invention, when light reflected/diffracted by the recording medium is divided into a pair of inner and outer light areas on the radial direction of the recording medium, the photodetector includes first and second inner light receiving areas arranged along the tangential direction of the track of the recording medium, each independently performing photoelectric conversion by receiving light of the inner light area. Furthermore, the signal processor comprises a differentiator to receive and subtract the detection signal of the first inner light receiving area and the detection signal of the second inner light receiving area, and output the tangential tilt error signal.

In another embodiment of the present invention, when light reflected/diffracted by the recording medium is divided into a pair of inner and outer light areas in the radial direction of the recording medium, the photodetector includes first and second outer light receiving areas arranged along the tangential direction of the track of the recording medium, each independently performing photoelectric conversion by receiving light of part of the first and second outer light areas, and third and fourth outer light receiving areas arranged at one side of the second and first outer light areas in the tangential direction of the recording medium, each independently performing photoelectric conversion by receiving the other part of the outer light area, in which the signal processor outputs a differential value between a sum signal of the detection signals of the first and second outer light receiving areas and a sum signal of the detection signals of the third and fourth outer light receiving areas as the tangential tilt error signal.

In another embodiment of [in] the present invention, the photodetector comprises first and second inner light receiving areas arranged in the tangential direction of the track of the recording medium, first and second outer light receiving areas arranged at both sides of the first inner light receiving area in the radial direction of the recording medium, and third and fourth outer light receiving areas respectively arranged at one side of the second and first outer light receiving areas at both sides of the second inner light receiving area in the radial direction of the recording medium, and has at least six separate structures, in which the signal processor comprises a first differentiator to receive and subtract the detection signal of the first inner light receiving area and the detection signal of the second inner light receiving area, a second differentiator to receive and subtract a sum signal of the detection signals of the first and second outer light receiving areas and a sum signal of the detection signals of the third and fourth outer light receiving areas, and an adder to add output from the first and second differentiators and output a tangential tilt error signal.

According to an aspect of the present invention, the recording medium is in a land/groove format, and the tangential tilt error signal output from the signal processor exhibits the opposite polarity of a land/groove.

According to another aspect of the present invention, the signal processor further comprises an inverter to selectively invert and output the polarity of the detected tangential tilt error signal according to a land/groove determination value of a system controller, to determine a land or a groove.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE INVENTION

Figure 1:
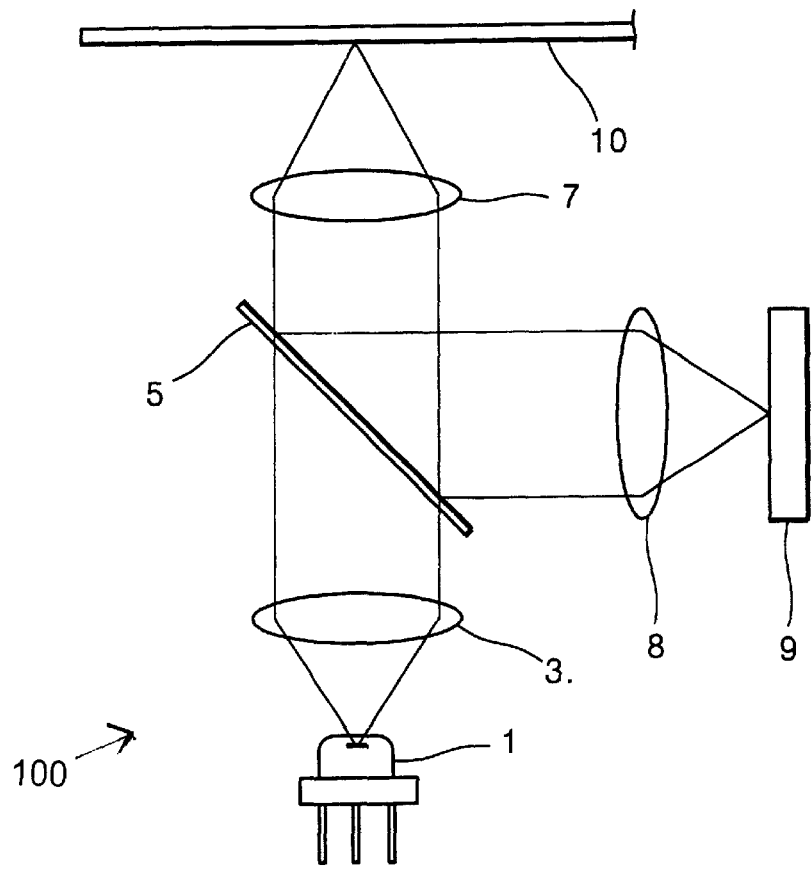
FIG. 1 is a schematic view showing a conventional tilt error signal detecting apparatus.

Reference will now be made in detail to the present preferred embodiments of the present invention, examples of which are illustrated in the accompanying drawings, wherein like reference numerals refer to like elements throughout.

Figure 3:
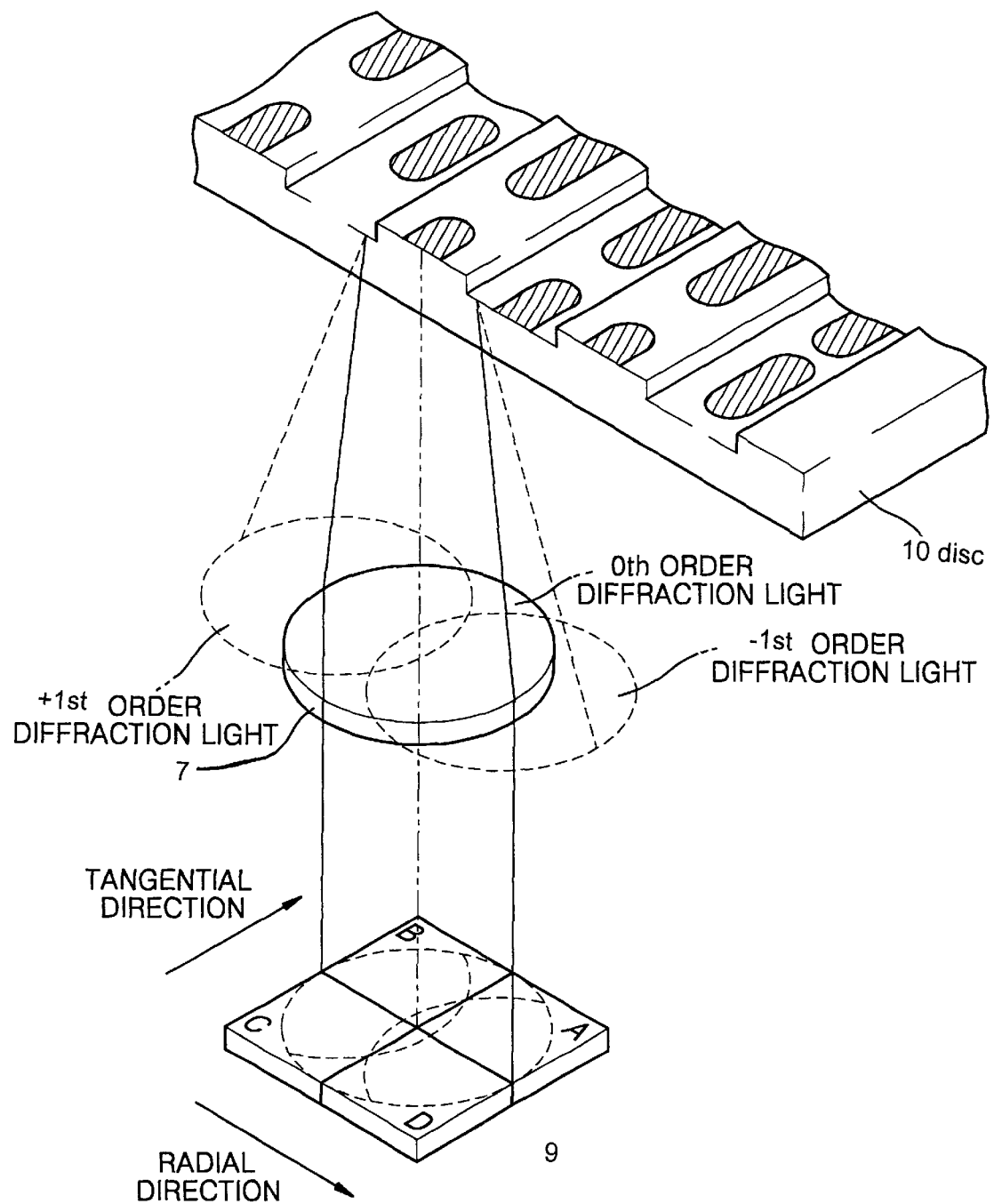
FIG. 3 is a perspective view showing the light reflected/diffracted by the disc of FIG. 1 in land/groove format.
Figure 5:
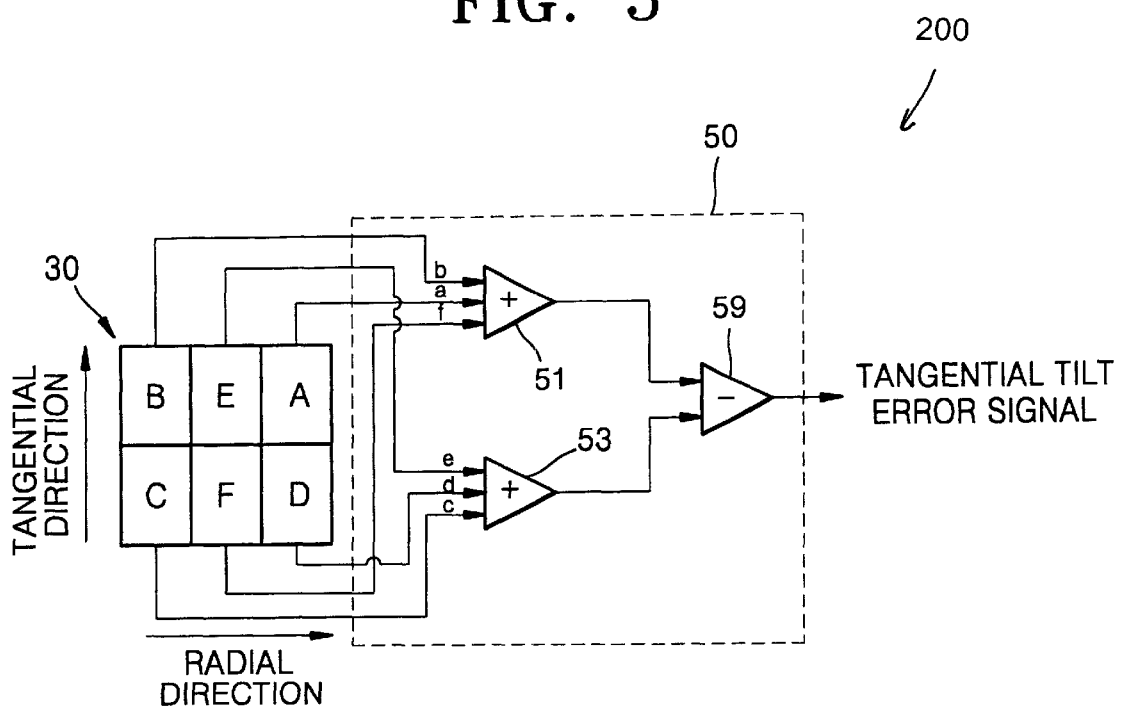
FIG. 5 is a schematic view showing the structure of an error signal detecting apparatus for an optical recording/reproducing apparatus according to a preferred embodiment of the present invention.

Referring to FIG. 5, an error signal detecting apparatus 200 for an optical recording/reproducing apparatus according to a first embodiment of the present invention includes a photodetector 30 having a plurality of light receiving areas, each independently receiving light of a particular light area, in which a beam profile of light reflected/diffracted by a recording medium changes to the opposite profile according to the tangential tilt of the recording medium, and a signal processor 50 to produce a tangential tilt error signal from a detection signal of the photodetector 30. Here, the recording medium is a high density recording/reproducing disc in a land/groove format, similar to that shown in FIG. 3.

Figure 4A:
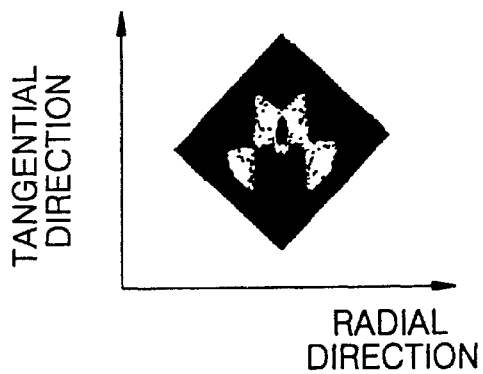
FIGS. 4A–4C respectively show a profile of a light beam reflected/diffracted by the disc of FIG. 3 and received by the photodetector, in which negative tangential tilt has occurred, tangential tilt has not occurred, and positive tangential tilt has occurred.
Figure 4B:
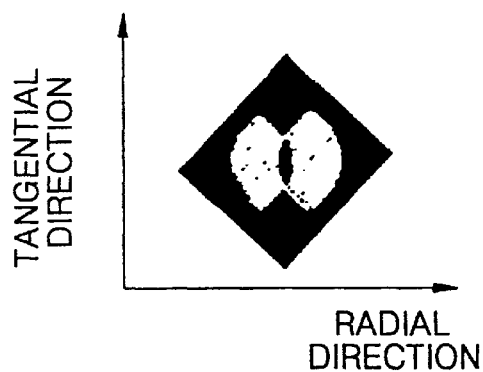
Figure 4C:
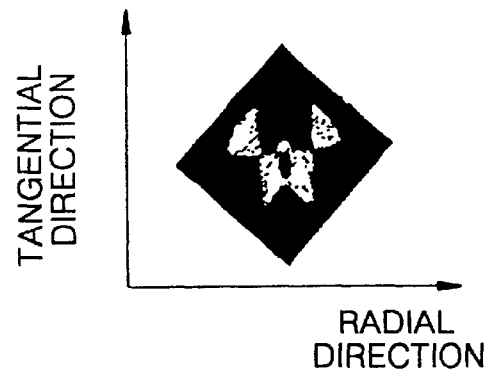

The photodetector 30 has at least six separate plates to detect a change in the profile of the light beam according to the tangential tilt, as shown in FIGS. 4A through 4C. That is, as shown in FIG. 5, the photodetector 30 includes first and second inner light receiving areas E and F, respectively, arranged along a track tangential direction of the recording medium, first and second outer light receiving areas A and B, respectively, arranged at both sides of the first inner light receiving area E along a radial direction of the recording medium, and third and fourth outer light receiving areas C and D, respectively, arranged at both sides of the second inner light receiving area F along the radial direction of the recording medium. Here, the first through fourth outer light receiving areas A, B, C and D are arranged counterclockwise.

The first and second inner light receiving areas E and F are formed to have widths in the radial direction such that they receive about 10–80% of the diameter of the incident $0^{th}$ order diffraction light, which is reflected/diffracted by the recording medium. The widths of the first and second inner light receiving areas E and F in the radial direction are determined according to the track pitch of the recording medium, the numerical aperture of an objective lens (not shown), and the wavelength of light emitted from a light source (not shown).

In the photodetector 30 having the above structure, the first inner light receiving area E and the third and fourth outer light receiving areas C and D are areas for mainly detecting the profile of the light beam generated when a tangential tilt in one direction is generated, as shown in FIG. 4A, and the second inner light receiving area F and the first and second outer light receiving areas A and B are areas for mainly detecting the profile of the light beam generated when a tangential tilt in the opposite direction is generated, as shown in FIG. 4C.

That is, the first and second inner light receiving areas E and F detect the presence of the profiles of light beams varying in the opposite directions according to a tangential tilt error generated in the opposite directions. Likewise, the first and second outer light receiving areas A and B and the third and fourth outer light receiving areas C and D detect the presence of the profiles of light beams varying in opposite directions according to a tangential tilt error generated in the opposite directions.

Figure 2:
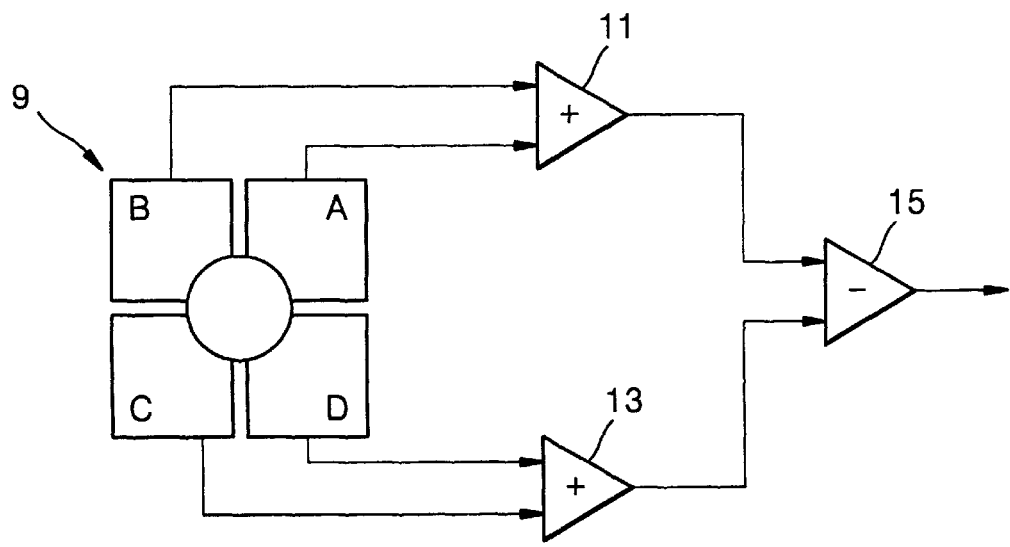
FIG. 2 is a schematic view showing a photodetector of the conventional tilt error signal detecting apparatus of FIG. 1.
Figure 6:
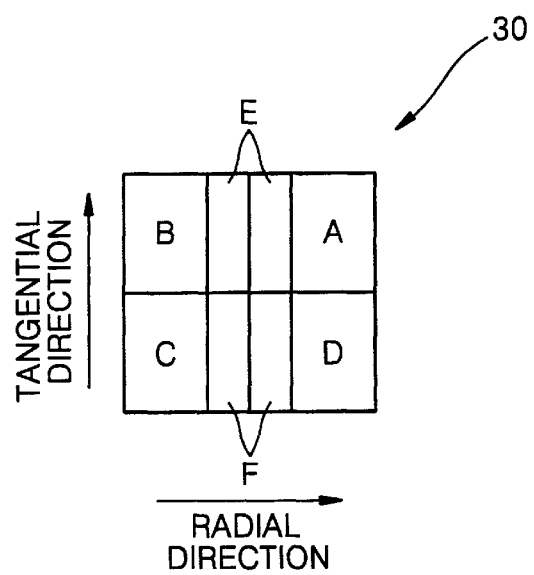
FIG. 6 is a schematic view showing a different photodetector for the error signal detecting apparatus of FIG. 5.

The photodetector 30 may have a structure of eight separate plates arranged in a 2×4 matrix such that each of the first and second inner light receiving areas E and F is divided into two parts with respect to a center axis parallel to the tangential direction, as shown in FIG. 6. It is obvious that the photodetector 30 having the eight separate plates can be used as a photodetector to record/reproduce information signals of the recording medium, and to detect information signals, focus error signals and/or tracking error signals as in the photodetector 9 having four separate plates as shown in FIG. 2. The photodetector 30 having the eight separate plate structure can also be applied to an error signal detecting apparatus for an optical recording apparatus according to other embodiments of the present invention.

It is a feature of the first embodiment of the present invention that the signal processor 50 is provided to detect a tangential tilt error signal from tangential push-pull signals of detection signals e and f of the first and second inner light receiving areas E and F, respectively, and detection signals a, b, c and d of the [so] first through fourth outer light receiving areas A, B, C and D, respectively.

The signal processor 50 includes a first adder 51 to add the detection signals f, a and b, of the second inner light receiving area F and the first and second outer light receiving areas A and B. The profiles of light beams generated when a tangential tilt is generated in one direction is mainly detected in these light receiving areas. A second is also provided to add the detection signals e, c and d of the first inner light receiving area E and the third and fourth outer light receiving areas C and D. The profiles of light beams generated when a tangential tilt is generated in the opposite direction is mainly detected in these light receiving areas. A differentiator 59 is also provided to subtract input detection signals from the first and second adders 51 and 53.

Thus, when the magnitudes of the detection signals e, c and d increase according to the tangential tilt, the magnitudes of the detection signals. Also, when the magnitudes of the detection signals f, a and b increase according to the tangential tilt, the magnitudes of the detection signals e, c and d decrease. Thus, the differentiator 59 outputs a tangential tilt error signal when the magnitudes of the detection signals change.

Figure 7:
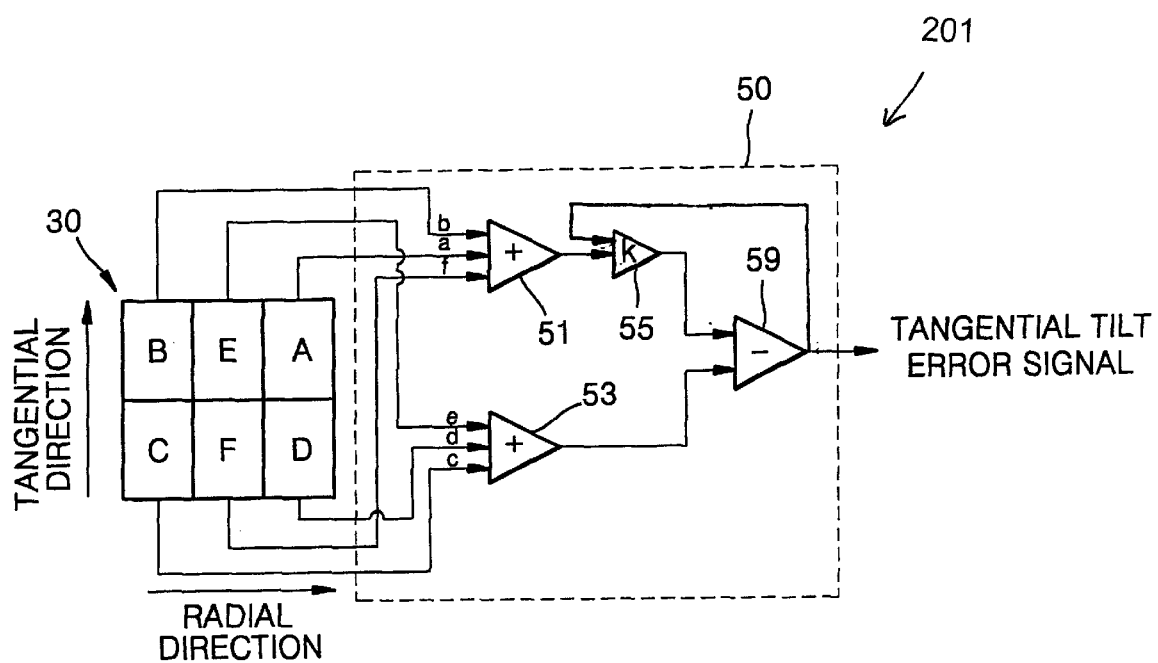
FIGS. 7–10 are schematic views showing error signal detecting apparatuses according to other embodiments of the present invention.

As shown in FIG. 7, in an error signal detecting apparatus 201 according to another embodiment of the present invention, the signal processor 50 further includes a gain controller 55, for example, between the first adder 51 and the differentiator 59, to apply a predetermined gain (k) to at least one signal of the signals input to the differentiator 59. Here, the gain k controls a separation ratio of the inner and outer light receiving areas and a balance of the detected tilt error signal. The tangential tilt error signal output from the differentiator 59 is controlled to be optimized by feeding the tangential tilt error signal output from the differentiator 59 back to the gain controller 55.

Figure 8:
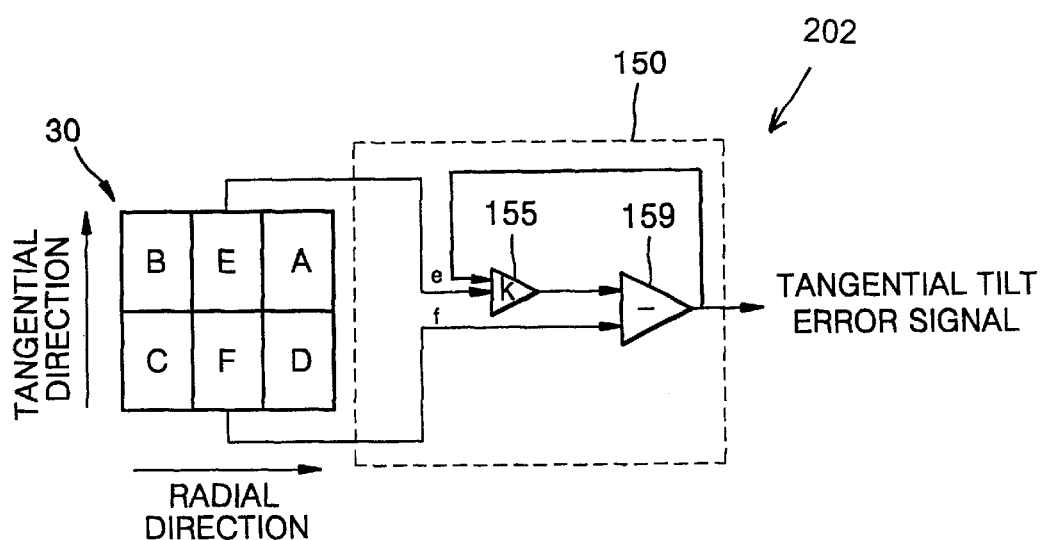
Figure 9:
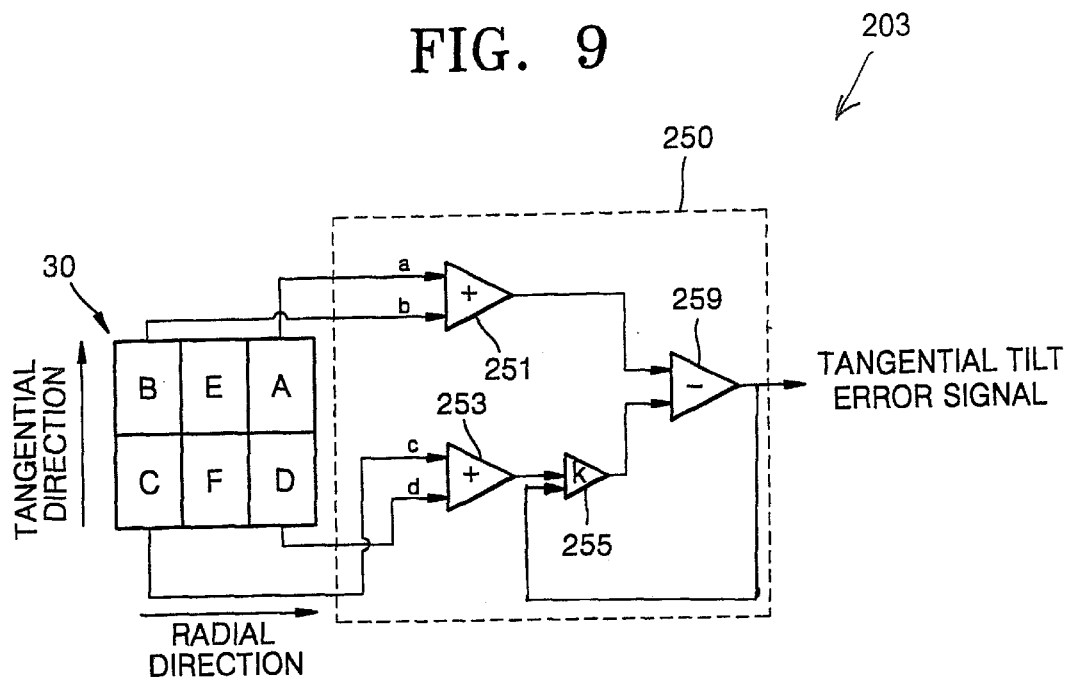

FIGS. 8 and 9 show error signal detecting apparatuses 202, 203 for an optical recording/reproducing apparatus according to other embodiments of the present invention. Here, the same reference numerals as those in FIG. 5 denote the substantially same members.

Referring to FIG. 8, the signal processor 150 includes a differentiator 159 to receive a detection signal e of the first inner light receiving area E and a detection signal f of the second inner light receiving area F, to subtract the received signals e and f, and to output a tangential tilt error signal, so that the tangential tilt error signal can be detected by using the detection signals e and f of the first and second inner light receiving areas E and F. Here, an error signal detecting apparatus 202 for an optical recording/reproduction apparatus according to another embodiment of the present invention having the signal processor 150 includes a photodetector 30 having only the inner light receiving areas E and F. That is, in this embodiment, the photodetector 30 may have first and second inner light receiving areas arranged along a tangential direction on a track of the recording medium so that photoelectric conversion can be independently performed by receiving light in the inner light area when the light reflected/diffracted by the recording medium is divided into a pair of outer light areas and inner light areas at the center thereof in the radial direction of the recording medium.

Referring to FIG. 9, the signal processor 250 includes a first adder 251 to add detection signals a and b of the first and second outer light receiving areas A and B, a second adder 253 to add detection signals c and d of the third and fourth outer light receiving areas C and D, and a differentiator 259 to receive sum signals output from the first and second adders 251, 253, subtract the received sum signals, and output a tangential tilt error signal, so that the tangential tilt error signal can be detected by using the detection signals a, b, c and d of the first, second, third and fourth outer light receiving areas A, B, C and D. Here, an error signal detecting apparatus 203 for an optical recording/ reproduction apparatus according to yet another embodiment of the present invention having the signal processor 250 of FIG. 9 includes a photodetector 30 including only the first through fourth outer light receiving areas A, B, C and D. That is, in this embodiment, the photodetector 30 has first and second outer light receiving areas A and B arranged along the radial direction of the recording medium to independently perform photoelectric conversion by receiving light of a part of the outer light receiving areas, and third and fourth outer light receiving areas C and D, arranged at one side along the tangential direction of the track of the recording medium to perform photoelectric conversion by receiving light of the other part of the outer light receiving areas, when the light reflected/diffracted by the recording medium is divided into a pair of outer light [area] areas and inner light areas at the center thereof in [a] the radial direction of the recording medium.

The signal processors 150, 250, as shown in FIGS. 8 and 9, further include gain controllers 155, 255, respectively, to apply a predetermined gain (k) to at least one of the signals input to the differentiators 159, 259, and to control a balance of the tangential tilt error signal output from the differentiators 159, 259.

Figure 10:
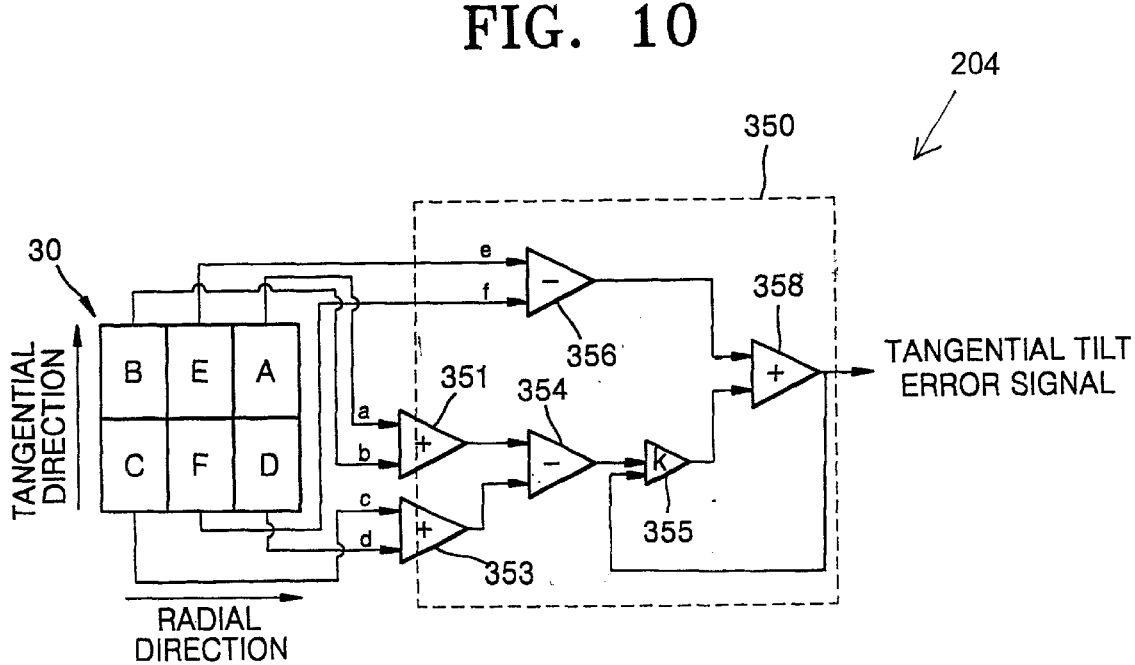

FIG. 10 shows an error signal detecting apparatus 204 for an optical recording/reproducing apparatus according to yet another embodiment of the present invention. A signal processor 350 determines a subtracting signal (e–f) between the detection signals e and f of the first and second inner light receiving areas E and F, and a subtracting signal between a sum signal (a+b) of the detection signals a and b of the first and second outer light receiving areas A and B and a sum signal (c+d) of the detection signals c and d of the third and fourth outer light receiving areas C and D, is obtained. Then, the subtracting signals are added to detect a tangential tilt error signal.

That is, the signal processor 350 includes a first differentiator 356 to receive and subtract the detection signals e and f of the first and second inner light receiving areas E and F, thereby producing a tangential tilt error signal component from the detection signals e and f, a first adder 351 to add the detection signals a and b of the first and second outer light receiving areas A and B, a second adder 353 to add the detection signals c and d of the third and fourth outer light receiving areas C and D, a second differentiator 354 to subtract the signals output from the first and second adders 351, 353, thereby producing another tangential tilt error signal component from the detection signals of the first, second, third and fourth outer light receiving areas A, B, C and D, and a third adder 358 to add the signals output from the first and second differentiators 356, 354.

Here, a gain controller 355 to apply a predetermined gain (k) to at least one of the signals input to the third adder 358, a signal input to the third adder 358 from the second differentiator 354 is positioned between the second adder 353 and the third adder 358.

Thus, by including the gain controller 355, the difference in the amplitude between the tangential tilt error signal component obtained from the detection signals e, f of the inner light receiving areas E and F and the tangential tilt error signal component obtained from the detection signals a, b, c and d of the outer light receiving areas A, B, C and D, is compensated for so that a more accurate tangential tilt error signal can be detected.

In the error signal detecting apparatus for an optical recording/reproducing apparatus according to embodiments of the present invention, even when the objective lens is shifted or the distance between the objective lens and the disc is deviated from the on-focus position, the signal output therefrom is not sensitive to these changes and thus an accurate tangential tilt error signal can be detected.

Also, since the photodetector 30 according to the present invention has a structure of at least six separate plates so that it can detect a change in the profile of the light beam according to the tangential tilt, a tangential tilt error signal can be accurately detected.

Referring to FIGS. 11 through 18, the principle of detecting a tangential tilt error signal by using an error signal detecting apparatus for an optical recording/reproducing apparatus according to the present invention will be described.

In the graphs shown in FIGS. 11 through 18, a horizontal axis (x-axis) indicates the distance in the radial direction from the center of a predetermined land or groove, and numerals on the horizontal axis denote the positions of the centers of the lands or grooves, that is, the center of each track. That is, assuming that the distance from the center of a land to the center of a neighboring groove or the distance from the center of a groove to the center of a neighboring land is a track pitch Tp, the numerals, 1, 2, 3, . . . , on the horizontal axis denote 1 time, 2 times, 3 times Tp, respectively. When a point where x=0 is assumed to be the center of a groove, a point where x=1 indicates the position of the center of a land which is the next track.

Here, the graphs in FIGS. 11 through 18 show a case in which an objective lens having a numerical aperture of 0.65 is used to form a light spot on a recording medium in a land/groove format, for example, next generation DVDs or, HD-DVD RAM discs, having a relatively small track pitch Tp of, for example, 0.37 $\mu$m, and the light reflected/ diffracted therefrom is detected by using the error signal detecting apparatuses for an optical recording/reproducing apparatus according to the embodiments of the present invention. Also, the graphs in FIGS. 11 through 18 show signals when a tracking servo is not operated, that is, in a tracking "off" state.

Figure 11:
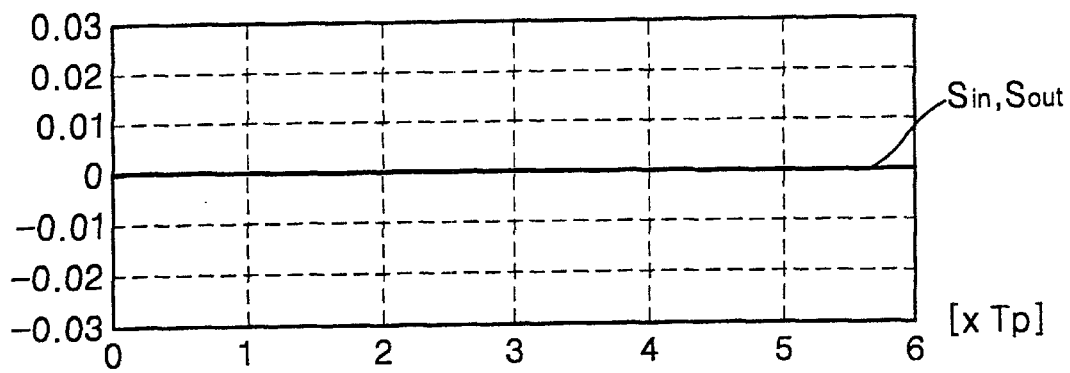
FIGS. 11–18 are graphs explaining the principle in which the error signal detecting apparatus for the optical recording/reproducing apparatus according to the present invention detects a tangential tilt error signal.

First, when there is no radial tilt and no tangential tilt, a tangential push-pull signal (Sin:e−f) from the detection signals e and f of the first and second inner light receiving areas E and F and a tangential push-pull signal (Sout:(c+d)−(a+b)) from the detection signals a, b, c and d of the first through fourth outer light receiving areas A, B, C and D, are both zero, as shown in FIG. 11. The graph in FIG. 11 shows a signal output when a tracking servo is not operated, that is, in a tracking "off" state, and the gain rate (k) is 1 in the signal processors 150, [and] 250 of FIGS. 8 and 9.

Figure 12:
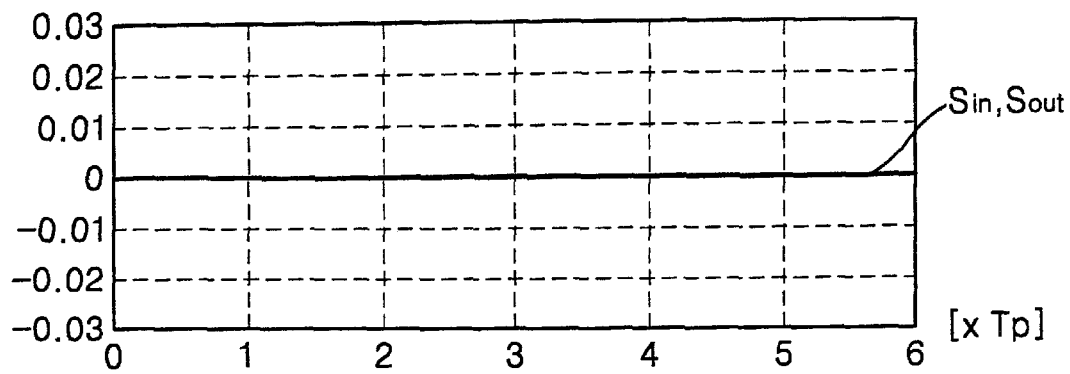

Also, when there is a radial tilt of about 0.5°, the tangential push-pull signals Sin and Sout are zero, as shown in FIG. 12.

Figure 13:
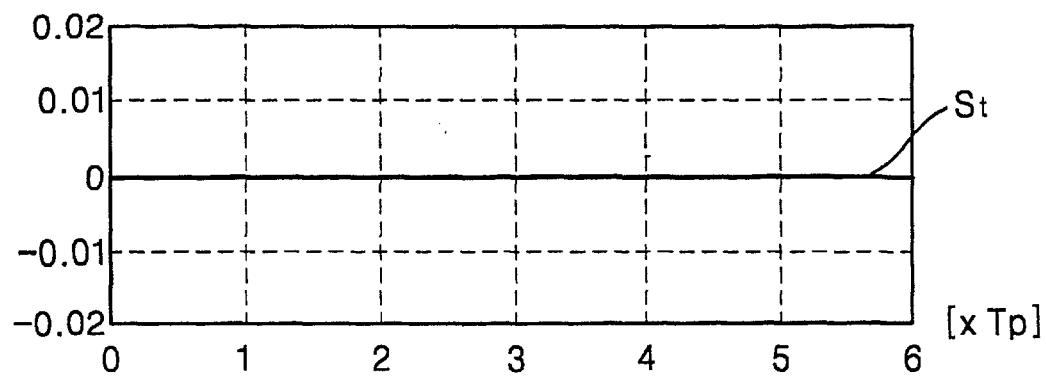

When there is no radial tilt and no tangential tilt, a tangential tilt error signal (St:(e+c+d)−(f+a+b)=Sin−Sout) using all the detection signals a, b, c, d, e, and f, is zero, as shown in FIG. 13. The graph in FIG. 13 shows a signal output from the signal processor 50 of FIG. 5 when a tracking servo is not operated, that is, in a tracking "off" state.

Figure 14:
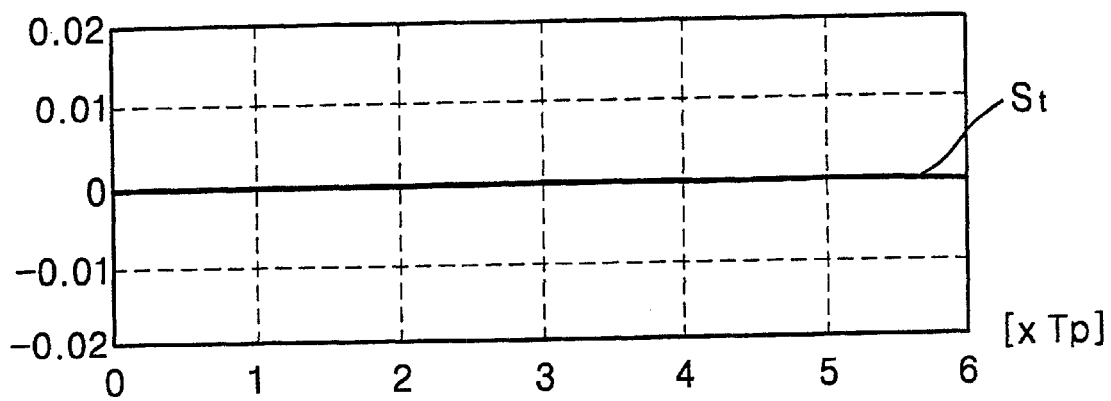

Also, when there is a radial tilt of about 0.5°, the tangential tilt error signal St is zero, as shown in FIG. 14.

Thus, as can be seen from FIGS. 11 through 14, when the error signal detecting apparatus for an optical recording/reproducing apparatus according to the present invention is in use, a tangential tilt error signal can be detected without being affected by a tracking error and a radial tilt error.

Figure 15:
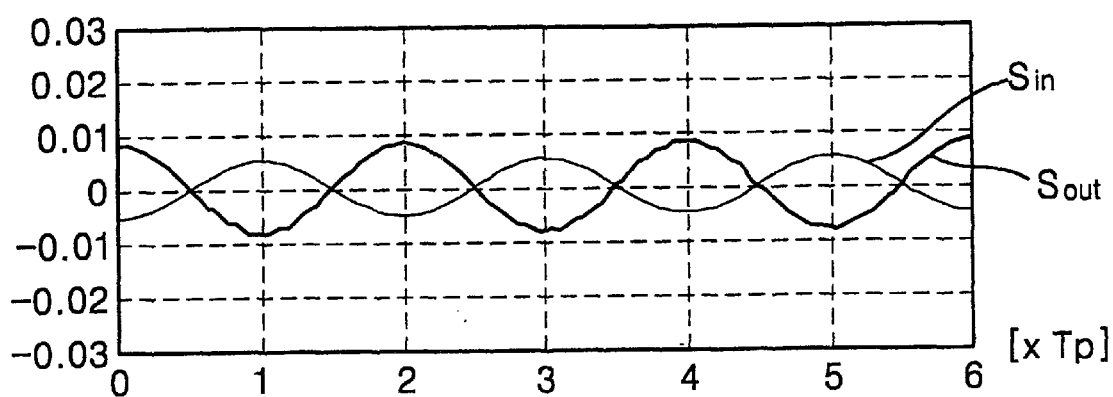

The graph in FIG. 15 shows a tangential push-pull signal (Sin:e−f) from the detection signals e and f of the first and second inner light receiving areas E and F, and a tangential push-pull signal (Sout:(c+d)−(a+b)) from the detection signals a, b, c and d of the first through fourth outer light receiving areas A, B, C and D when, for example, there is a tangential tilt of about 0.5°. In FIG. 15, the tangential push-pull signals Sin and Sout are output signals of the signal processors 150, 250 of FIGS. 8 and 9 when the gain rate (k) is 1. As can be seen from FIG. 15, the tangential push-pull signals (Sin and Sout) have values other than 0 at the position of the center of a track and the magnitude thereof is proportional to the tangential tilt.

Figure 16:
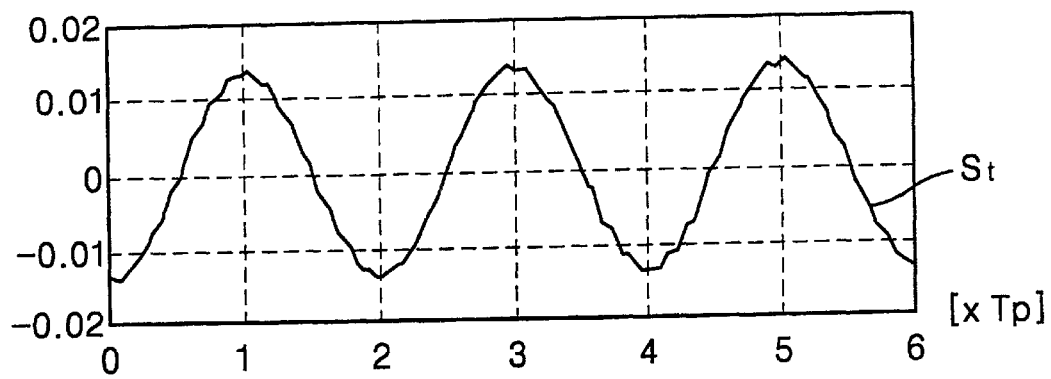

FIG. 16 is a graph showing a tangential tilt error signal (St:(e+c+d)−(f+a+b) Sin−Sout) using all the detection signals a, b, c, d, e and f when, for example, there is a tangential tilt of about 0.5°. The tangential tilt error signal St is obtained by subtracting the Sout signal from the Sin signal of FIG. 15, which corresponds to the output signal of the signal processor 50 of [the] FIG. 5.

In FIG. 16, assuming that a point where x=0 is the center of a groove, a tangential tilt error signal at the center of a land where x=1 with respect to a positive tangential tilt is detected as a positive value, and a tangential tilt error signal at the center of a groove where x=2 is detected as a negative value.

Figure 17:
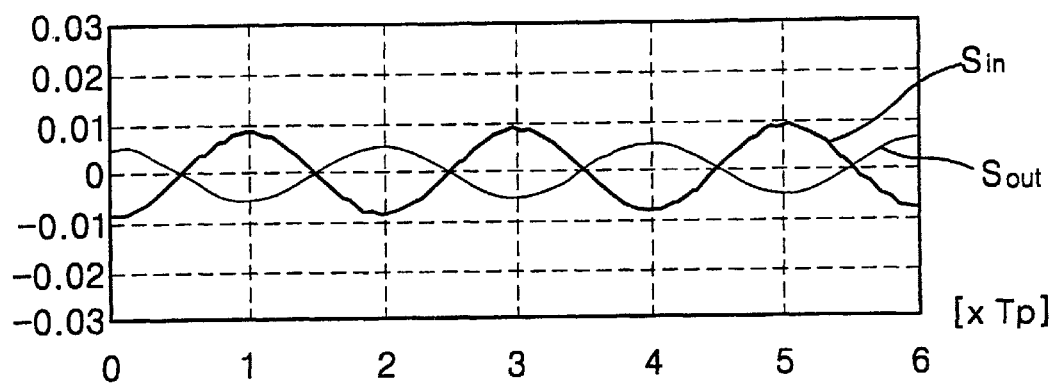
Figure 18:
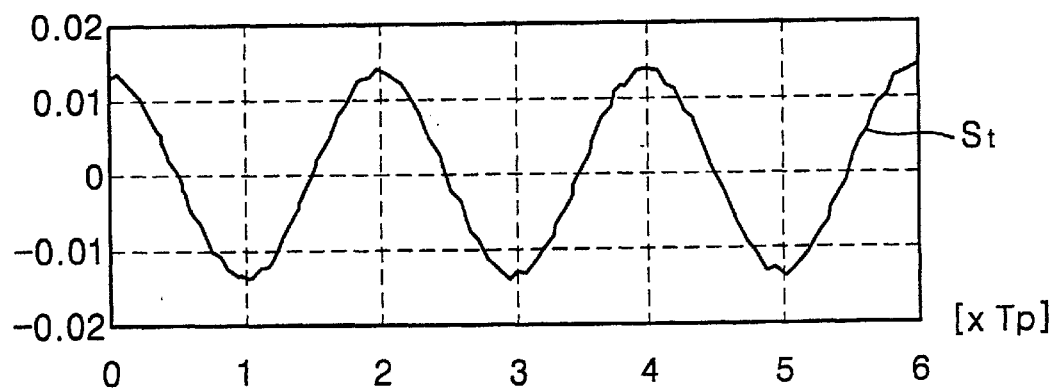

The graph in FIG. 17 shows the signals Sin and Sout when there is a tangential tilt of −0.5°. Also, the graph in FIG. 18 shows the tangential tilt error signal St when there is a tangential tilt of −0.5°. By comparison of the graphs in FIGS. 15 through 18, it can be seen that the phase of the tangential tilt error signal St of FIG. 18 and the signals Sin and Sout of FIG. 17 are different by 180° from those of the signals Sin and Sout of FIG. 15 and the signal St of FIG. 16, respectively.

Thus, as can be seen from FIGS. 11 through 18, when the error signal detecting apparatuses for an optical recording/reproducing apparatus according to the embodiments of the present invention are adopted, a tangential tilt error signal can be detected regardless of tracking and radial tilt errors.

Also, when the graphs in FIGS. 16 and 18 are compared with each other, for example, a tangential tilt error detection signal at the center of a land where x=1 with respect to a positive tangential tilt, is a positive value, and a tangential tilt error detection signal at the center of a land where x=1 with respect to a negative tangential tilt, is a negative value. The tangential tilt error detection signal at the center of a land where x=1, and the tangential tilt error detection signal at the center of a groove where x=2, exhibit opposite polarities.

Since the tangential tilt error signal detection values for the positive tangential tilt and the negative tangential tilt are detected to be signals having signs different from each other, when the error signal detecting apparatus for an optical recording/reproducing apparatus according to the embodiments of the present invention further includes an inverter 430 (show in FIG. 19) to selectively invert the polarity of the detected tangential tilt error signal according to a land/groove determination value of a system controller 410 to determine a land or a groove, not only the tangential tilt error signal but also the tangential tilt direction can be detected.

Figure 19:
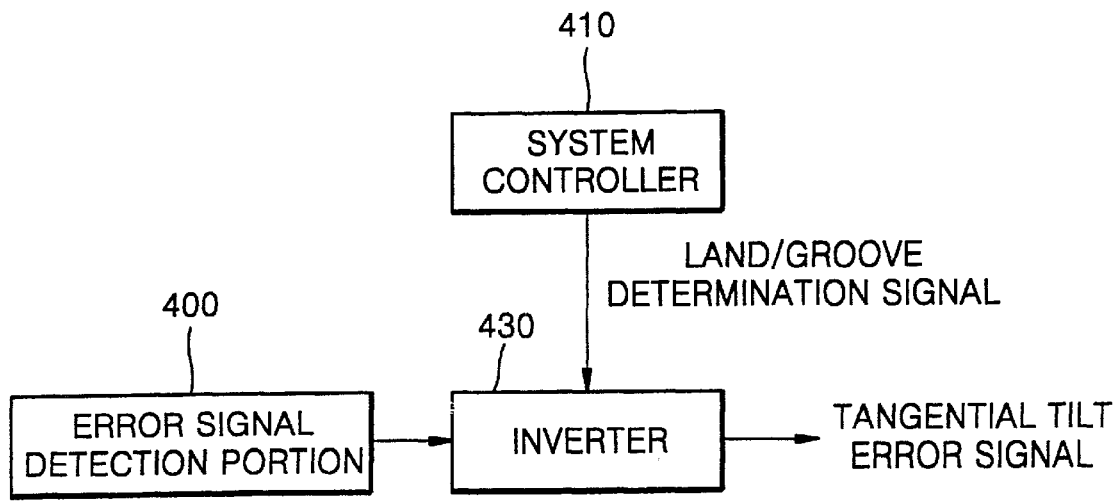
FIG. 19 is a block diagram showing the structure of an error signal detecting apparatus for an optical recording/ reproducing apparatus according to yet another [preferred] embodiment of the present invention.

Here, FIG. 19 shows an error signal detecting apparatus 205 for an optical recording/reproducing apparatus according to yet another embodiment of the present invention. Reference numeral 400 denotes a tangential tilt error signal detecting portion having a structure of the error signal detecting apparatuses for an optical recording/reproducing apparatus according to the embodiments of the present invention described with reference to FIGS. 5 and 7 through 9. A signal detected by the error signal detecting portion 400 is input to the inverter 430. The inverter 430 selectively inverts the detection signal of the error signal detecting portion 400 according to a land/groove determination signal to determine whether the position to which a main beam to record/reproduce an information signal output from the system controller 410 of the optical recording/reproducing apparatus is a land or a groove, and outputs a tangential tilt error signal.

For example, if a positive tangential tilt error signal is output from the light reflected/diffracted at the land position with respect to a positive tangential tilt, the inverter 430 inverts the signal detected by the error signal detecting portion 400 when a main beam is emitted to the groove position. Accordingly, the inverter 430 outputs a positive signal for a tangential tilt in one direction and a negative signal for a tangential tilt in the other direction, regardless of a land/groove. Therefore, the polarity of the signal output from the error signal detecting apparatus for an optical recording/reproducing apparatus according to the present invention indicates a tangential tilt direction and the magnitude of the signal indicates the magnitude of the tangential tilt.

Figure 20:
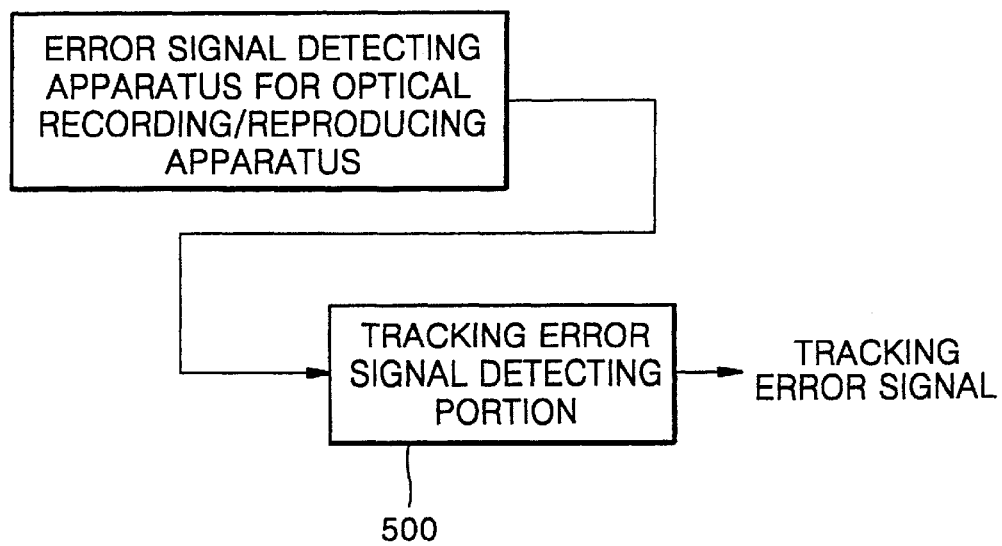
FIG. 20 is a block diagram showing an embodiment in which a detection signal of the error signal detecting apparatus for the optical recording/reproducing apparatus according to the present invention is applied to detect a tracking error signal.

The tangential tilt error signals detected by the error signal detecting apparatuses for an optical recording/reproducing apparatus according to the present invention, as shown in FIGS. 5, 7 through 10, and 19, are input to a tracking error signal detecting portion 500, as shown in FIG. 20, that is, a servo controller for tracking control, so that the signals can be applied to detect a more accurate tracking error signal.

For example, if the tangential tilt error signal is input to the servo controller for tracking control to add or subtract a low frequency component of the tangential tilt error signal from a tracking error signal, offset of the tracking error signal is corrected so that a more accurate tracking error signal can be detected.

Also, the tangential tilt error signal is input to the servo controller so that gain of the tracking error signal can be amplified by the low frequency component. Here, the gain of the tracking error signal is adjusted according to the absolute value of the tangential tilt error signal.

In the error signal detecting apparatus for an optical recording/reproducing apparatus according to the embodiments of the present invention, when the magnitudes of the signals detected at the tangential tilts of +1° and −1° are v1 and v2, respectively, the tangential tilt error value detected at the center of a track in a tracking "on" state is such that the maximum of the absolute value of (v1−v2)/(v1+v2) is equal to or less than 0.2.

Also, when the magnitudes of signals detected at tangential tilts of +1° and −1° with respect to a particular reference level are v1 and v2, respectively, the tilt error value detected at the center of a track in the tracking "on" state is such that the minimum of the absolute value from the particular reference value to v1 or v2 is about 20% of the maximum value of the tracking error signal detected in a normal state in a tracking "off" state.

The error signal detecting apparatuses for an optical recording/reproducing apparatus according to the embodiments of the present invention calculate a tangential tilt error signal by using a peak-to-peak value of a signal output from the signal processor in a tracking "off" state, or using the magnitude of the signal output from the signal processor at the point where a track error signal is zero.

Alternatively, the error signal detecting apparatuses for an optical recording/reproducing apparatus according to the embodiments of the present invention calculate a tangential tilt error signal by using a time difference between a peak value of a signal and a zero cross signal which are detected and output from at least one of the light receiving areas in [an off-track] a tracking "off" state.

As described above, in the error signal detecting apparatuses for an optical recording/reproducing apparatus according to the embodiments of the present invention, since a photodetector is adopted, a signal output from the error signal detecting apparatus is not changed when a shift is generated in the objective lens or the distance between the objective lens and the disc deviates from the on-focus position.

In particular, a change in the profile of the light beam according to a relative tangential tilt with respect to the objective lens of a recording medium in land/groove format can be properly detected so that an accurate tangential tilt error signal can be detected.

Also, a low frequency component of the tangential tilt error signal output from the error signal detecting apparatus for an optical recording/reproducing apparatus according to the present invention can be used to detect an accurate tracking error signal in which offset is corrected and gain is amplified.

What is claimed is:

1. An apparatus for an optical recording/reproducing apparatus, comprising:
   a photodetector to receive light reflected and diffracted by a recording medium, and to generate detection signals, the photodetector including a plurality of light receiving areas, each independently receiving a portion of the light, a profile of a beam of the light changing to an opposite profile according to a tangential tilt of the recording medium; and
   a signal processor to detect a tangential tilt error signal based upon the detection signals of the photodetector.

2. The apparatus as claimed in claim 1, wherein the photodetector has six separate structures and comprises:
   first and second inner light receiving areas arranged in a tangential direction of a track of the recording medium, respectively;
   first and second outer light receiving areas arranged at both sides of the first inner light receiving area in a radial direction of the recording medium, respectively; and
   third and fourth outer light receiving areas arranged at one side of the second and first outer light receiving areas, respectively, and at both sides of the second inner light receiving area in the radial direction of the recording medium, respectively;
   wherein the signal processor comprises:
      a first adder to add a detection signal of the first inner light receiving area and detection signals of the third and fourth outer light receiving areas and to output a resulting first addition signal;
      a second adder to add a detection signal of the second inner light receiving area and detection signals of the first and second outer light receiving areas and to output a resulting second addition signal; and
      a differentiator to subtract the first and second addition signals and to output the tangential tilt error signal.

3. The apparatus as claimed in claim 2, wherein the signal processor further comprises a gain controller to apply a predetermined gain to at least one of the first and second addition signals.

4. The apparatus as claimed in claim 1, wherein, when the light reflected/diffracted by the recording medium is divided into a pair of inner and outer light areas in a radial direction of the recording medium, the photodetector includes first and second inner light receiving areas arranged along a tangential direction of a track of the recording medium, each inner light receiving area independently performing photoelectric conversion by receiving the light of the inner light area, and
   the signal processor comprises a differentiator to receive and subtract a detection signal of the first inner light receiving area and a detection signal of the second inner light receiving area, and to output the tangential tilt error signal.

5. The apparatus as claimed in claim 4, wherein the signal processor further comprises a gain controller to apply a predetermined gain to at least one of the detection signals received by the differentiator.

6. The apparatus as claimed in claim 5, wherein the tangential tilt error signal is controlled to be optimized by feeding the tangential tilt error signal back to the gain controller.

7. The apparatus as claimed in claim 4, wherein the photodetector further comprises:
   first and second outer light receiving areas arranged at both sides of the first inner light receiving area in the radial direction of the recording medium; and
   third and fourth outer light receiving areas arranged at one side of the second and first outer light receiving areas, respectively, and at both sides of the second inner light receiving area in the radial direction of the recording medium, respectively.

8. The apparatus as claimed in claim 1, wherein, when the light reflected/diffracted by the recording medium is divided into a pair of inner and outer light areas in a radial direction of the recording medium, the photodetector includes:

first and second outer light receiving areas arranged along a tangential direction of a track of the recording medium, each independently performing photoelectric conversion by receiving the light of part of the outer light area; and third and fourth outer light receiving areas arranged at one side of the second and first outer receiving light areas in a tangential direction of the recording medium, respectively, each independently performing photoelectric conversion by receiving another part of the outer light area, wherein the signal processor outputs a differential value between a sum of detection signals of the first and second outer light receiving areas and a sum of detection signals of the third and fourth outer light receiving areas as the tangential tilt error signal.

9. The apparatus as claimed in claim 8, wherein the signal processor applies a predetermined gain (k) to one of the sums of the detection signals of the first and second outer light receiving areas and the third and fourth outer light receiving areas.

10. The apparatus as claimed in claim 8, wherein the photodetector further comprises:

a first inner light receiving area arranged between the first and second outer light receiving areas; and a second inner light receiving area arranged between the third and fourth outer light receiving areas, wherein the first and second inner light receiving areas generate detection signals, and the signal processor detects the tangential tilt error signal based upon the detection signals of the first and second inner light receiving areas in addition to the detection signals of the first and second outer light receiving areas and the third and fourth outer light receiving areas.

11. The apparatus as claimed in claim 1, wherein the photodetector comprises:

first and second inner light receiving areas arranged in a tangential direction of a track of the recording medium;

first and second outer light receiving areas arranged at both sides of the first inner light receiving area in a radial direction of the recording medium, respectively; and third and fourth outer light receiving areas arranged at one side of the second and first outer light receiving areas, respectively, and at both sides of the second inner light receiving area in the radial direction of the recording medium, respectively; and wherein the signal processor comprises:

a first differentiator to receive and subtract a detection signal of the first inner light receiving area and a detection signal of the second inner light receiving area and to output a first subtraction signal;

a second differentiator to receive and subtract a sum signal of detection signals of the first and second outer light receiving areas and a sum signal of detection signals of the third and fourth outer light receiving areas and to output a second subtraction signal; and an adder to add the first and second subtraction signals output from the first and second differentiators and to output the tangential tilt error signal.

12. The apparatus as claimed in claim 11, wherein the signal processor further comprises a gain controller to apply a predetermined gain (k) to at least one of the first and second subtraction signals.

13. The apparatus as claimed in claim 1, wherein the recording medium is in a land/groove format, and the tangential tilt error signal detected by the signal processor exhibits opposite polarity according to a current land/groove.

14. The apparatus as claimed in claim 13, wherein the signal processor further comprises an inverter to selectively invert and output the polarity of the detected tangential tilt error signal according to a land/groove determination value of a system controller to determine a land or a groove.

15. The apparatus as claimed in claim 1, wherein the photodetector comprises:

first and second inner light receiving areas arranged in a tangential direction of a track of the recording medium;

first and second outer light receiving areas arranged at both sides of the first inner light receiving area in a radial direction of the recording medium; and third and fourth outer light receiving areas arranged at one side of the second and first outer light receiving areas, respectively, and at both sides of the second inner light receiving area in the radial direction of the recording medium, wherein a width in the radial direction of the first and second inner light receiving areas of the photodetector is has a dimension so that the first and second inner light receiving areas receive 10% through 80% of a diameter of a $0^{th}$ order diffraction light which is incident by being reflected/diffracted by the recording medium.

16. The apparatus as claimed in claim 1, wherein, when magnitudes of the detection signals detected at tangential tilts of +1° and −1° with respect to a predetermined reference level are v1 and v2, respectively, and the signal processor detects a tilt error value at the center of a track in an on-track state such that a maximum of an absolute value of (v1−v2)/(v1+v2) is equal to or less than 0.2.

17. The apparatus as claimed in claim 1, wherein, when magnitudes of the detection signals detected at tangential tilts of +1° and −1° with respect to a particular reference level are v1 and v2, respectively, and the signal processor detects a tilt error value at the center of a track in an on-track state such that a minimum of an absolute value to v1 or v2 from the particular reference level is about 20% of a maximum value of a tracking error signal detected in a normal state of an off-track state.

18. The apparatus as claimed in claim 1, wherein the tangential tilt error signal is calculated by using a peak to peak value of a signal output from the signal processor in an off-track state, or using a magnitude of a signal output from the signal processor at a point where a track error signal is zero.

19. The apparatus as claimed in claim 1, wherein the tangential tilt error signal is calculated by using a time difference of a zero cross signal, or a peak value of a signal which is detected and output from at least one light receiving area among the light receiving areas in an off-track state.

20. The apparatus as claimed in claim 1, further comprising:

a servo controller, wherein the tangential tilt error signal is input to the servo controller and a low frequency component of the tangential tilt error signal is added and subtracted to and from a tracking error signal, to correct offset of the tracking error signal.

21. The apparatus as claimed in claim 1, further comprising:

a servo controller, wherein the tangential tilt error signal is input to the servo controller and a low frequency component of the tangential tilt error signal amplifies a gain of a tracking error signal.

22. The apparatus as claimed in claim 21, wherein the gain of the tracking error signal is controlled according to an absolute value of the tangential tilt error signal.

23. The apparatus as claimed in claim 1, wherein the photodetector comprises:
   first and second inner light receiving areas arranged in a tangential direction of a track of the recording medium;
   first and second outer light receiving areas arranged at both sides of the first inner light receiving area in a radial direction of the recording medium, respectively; and
   third and fourth outer light receiving areas respectively arranged at one side of the second and first outer light receiving areas and at both sides of the second inner light receiving area in the radial direction of the recording medium, respectively,
   wherein the photodetector has a structure of 8 separated receiving areas, arranged in a 2×4 matrix, formed by dividing each of the first and second inner light receiving areas with respect to a center axis parallel to the tangential direction.

24. The apparatus as claimed in claim 1, wherein a width in a radial direction of the first and second inner light receiving areas is determined according to a track pitch of the recording medium, a numerical aperture of an objective lens to focus the light onto the recording medium, and a wavelength of the light.

25. The apparatus as claimed in claim 1, further comprising:
   a system controller to determine a land or a groove of the recording medium, and to generate a land/groove determination value; and
   an inverter to invert a polarity of the tangential tilt error signal according to the land/groove determination value.

26. An error detecting apparatus comprising:
   a detector to detect a light beam from a recording medium, a profile of the light beam changing to an opposite profile as a result of a tangential tilt of the recording medium; and
   a processor to detect the tangential tilt by detecting the change of the light beam to the opposite profile.

27. The apparatus as claimed in claim 26, wherein the detector comprises:
   a first inner light receiving area;
   a first outer light receiving area, on a side of the first inner light receiving area; and
   a second outer light receiving area, on an opposite side of the first inner light receiving area from the first outer light receiving area.

28. The apparatus as claimed in claim 27, wherein the detector further comprises:
   a second inner light receiving area on a side of the first inner light receiving area;
   a third outer light receiving area, on a side of the second inner light receiving area; and
   a fourth outer light receiving area, on an opposite side of the second inner light receiving area from the third outer light receiving area.

29. The apparatus as claimed in claim 28, wherein the processor comprises:
   a first adder to add a detection signal of the first inner light receiving area and detection signals of the third and fourth outer light receiving areas and to output a resulting first addition signal;
   a second adder to add a detection signal of the second inner light receiving area and detection signals of the first and second outer light receiving areas and to output a resulting second addition signal; and
   a differentiator to subtract the first and second addition signals and to output a resulting tangential tilt error signal.

30. The apparatus as claimed in claim 28, wherein the processor comprises:
   a first differentiator to subtract a detection signal of the first inner light receiving area and a detection signal of the second inner light receiving area and to output a resulting first subtraction signal;
   a second differentiator to subtract a sum signal of detection signals of the first and second outer light receiving areas and a sum signal of detection signals of the third and fourth outer light receiving areas and to output a resulting second subtraction signal; and
   an adder to add the first and second subtraction signals and to output a resulting tangential tilt error signal.

31. A method of detecting error comprising:
   receiving a light beam from a recording medium, a profile of the light beam changing to an opposite profile according to a tangential tilt of the recording medium; and
   detecting the tangential tilt by detecting the change of the light beam to the opposite profile.

32. A method of detecting error comprising:
   adding a detection signal of a first inner light receiving area and detection signals of third and fourth outer light receiving areas to generate a first addition signal, the first inner light receiving area being on an opposite side of an axis in a radial direction of a recording medium from the third and fourth outer light receiving areas;
   adding a detection signal of a second inner light receiving area and detection signals of first and second outer light receiving areas to generate a second addition signal the first and second inner light receiving areas, the second inner light receiving area being on an opposite side of the axis from the second and first outer light receiving areas; and
   subtracting the first and second addition signals to generate a tangential tilt error signal.

33. A method of detecting error comprising:
   subtracting a detection signal of a first inner light receiving area and a detection signal of a second inner light receiving area to generate a first subtraction signal, the first inner light receiving area being on an opposite side of an axis in a radial direction of a recording medium from the second inner light receiving area;
   subtracting a sum signal of detection signals of first and second outer light receiving areas and a sum signal of detection signals of third and fourth outer light receiving areas to generate a second subtraction signal; and
   adding the first and second subtraction signals to generate a tangential tilt error signal.

* * * * *